US005335322A

United States Patent [19]

Mattison

[11] Patent Number: 5,335,322

[45] Date of Patent: Aug. 2, 1994

[54] COMPUTER DISPLAY SYSTEM USING SYSTEM MEMORY IN PLACE OR DEDICATED DISPLAY MEMORY AND METHOD THEREFOR

[75] Inventor: Phillip E. Mattison, Gilbert, Ariz.

[73] Assignee: VLSI Technology, Inc., San Jose, Calif.

[21] Appl. No.: 861,403

[22] Filed: Mar. 31, 1992

[51] Int. Cl.[5] .............................................. G06F 15/62

[52] U.S. Cl. .................................... 395/164; 395/162; 395/325; 345/185

[58] Field of Search ................................ 395/162–164, 395/325, 128; 364/DIG. 1; 345/112, 132, 133, 197, 185, 189, 196

[56] References Cited

U.S. PATENT DOCUMENTS 5,064,023 9/1991 Katsura et al. ...................... 395/164

5,083,260 1/1992 Tsuchiya ...................... 364/DIG. 1

*Primary Examiner*—Dale M. Shaw

*Assistant Examiner*—Kee M. Tung

*Attorney, Agent, or Firm*—Harry M. Weiss & Associates

[57] ABSTRACT

A computer display system and method is disclosed which allows a display controller in the display system to use a block of system memory rather than a dedicated frame buffer for display modes that do not require the bandwidth or the memory size of a dedicated frame buffer. The display system of the present invention includes an optional dedicated frame buffer to allow the display controller to support display modes that require the performance of the dedicated frame buffer, while retaining the capability to use system memory as a frame buffer for display modes that would only partially use the dedicated frame buffer.

7 Claims, 2 Drawing Sheets

COMPUTER DISPLAY SYSTEM USING SYSTEM MEMORY IN PLACE OR DEDICATED DISPLAY MEMORY AND METHOD THEREFOR

FIELD OF THE INVENTION

This invention generally relates to computers and methods therefor, and more specifically relates to a computer display system and method therefor comprising a display controller having the capability of using the computer's system memory rather than having dedicated display memory.

DESCRIPTION OF THE PRIOR ART

The prior art computer display system used a display controller in conjunction with a dedicated frame buffer to store the information for refreshing the display. In certain display modes, only a very small portion of the available frame buffer's memory capacity and bandwidth were used. If these display modes that require a small portion of the frame buffer were used exclusively, the majority of the frame buffer memory capacity and bandwidth were wasted. The ability for the display controller to use an alternative memory source as the frame buffer would eliminate this waste, thereby reducing system complexity and cost.

Therefore, there existed a need to provide a computer display system and method therefor which can use the system memory of the computer as a frame buffer instead of using a more expensive dedicated frame buffer.

SUMMARY OF THE INVENTION

It is an object of this invention to provide a computer display system and method therefor having the capability to use a portion of the computer's system memory as the frame buffer for refreshing the display.

It is another object of this invention to provide a computer display system and method therefor comprising in part a Video Graphics Adapter (VGA) controller having the capability to use a portion of the computer's system memory as the frame buffer for refreshing the VGA display.

According to the present invention, a computer display system is provided with an associated display controller. A VGA controller is shown herein for illustrative purposes. The controller of the present invention differs from the prior art display controller in that it has the capability of using the computer system memory in place of the dedicated frame buffer of the prior art. To use the computer system memory for a frame buffer, the VGA controller requests control of the system data bus from the computer Central Procession Unit (CPU). When the CPU relinquishes the bus, the VGA controller takes over the bus and transfers display data in a defined block of system memory that acts as a frame buffer to a First-In First-Out (FIFO) memory known as the Display FIFO on the VGA controller. Once the transfer takes place, the VGA controller relinquishes the bus, allowing the CPU to continue processing.

The VGA controller may use the computer system memory, or it may alternatively use a dedicated frame buffer similar to the prior art VGA controller. In this manner the display system of the present invention can be installed into a computer system and configured to use either system memory or the dedicated frame buffer, depending on the video mode selected and the performance required by the particular application.

The foregoing and other objects, features and advantages will be apparent from the following description of the preferred embodiment of the invention as illustrated in the accompanying drawings.

DESCRIPTION OF THE PREFERRED EMBODIMENT

Figure 1:
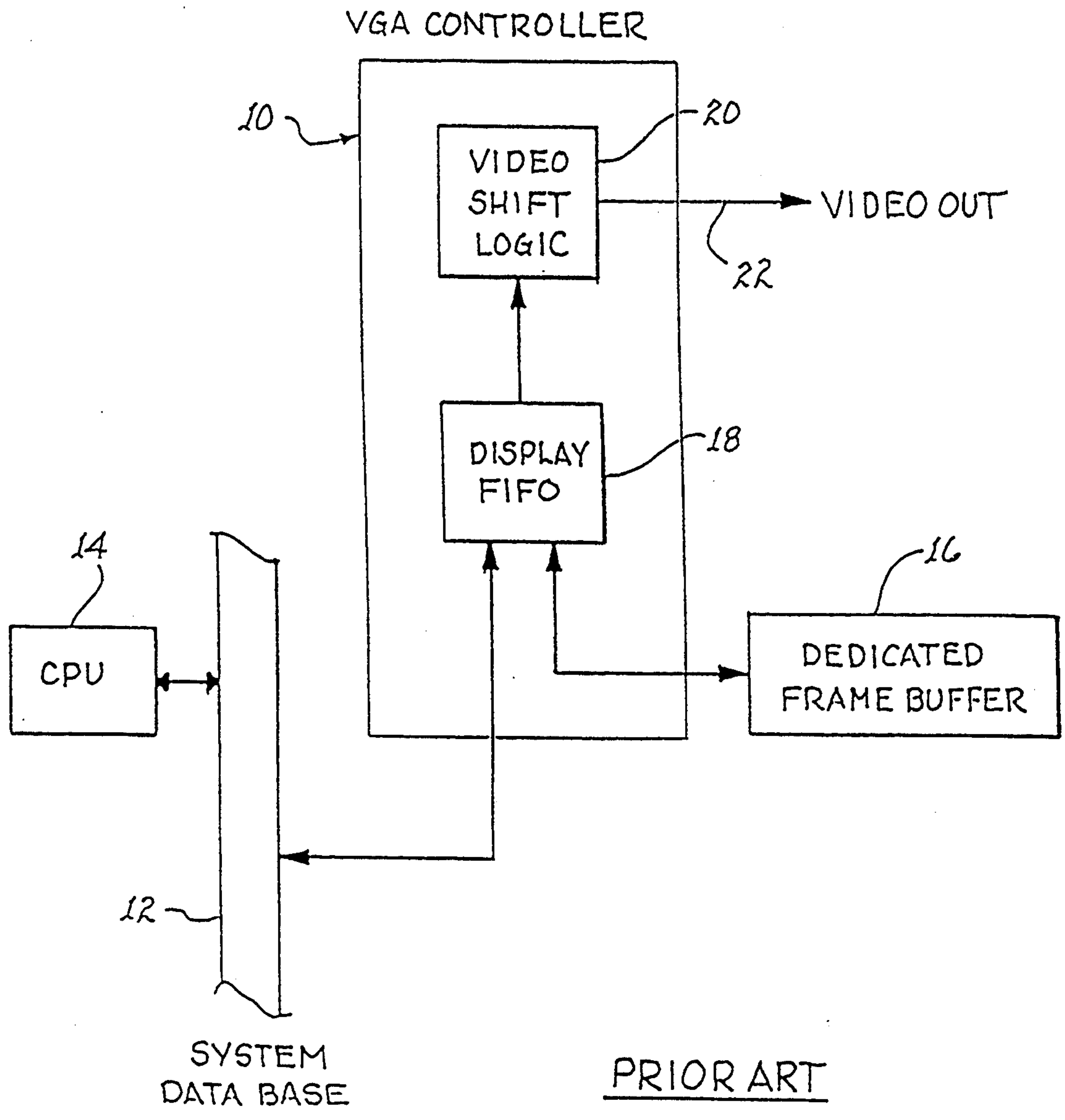
FIG. 1 is a block diagram of the computer display system of the prior art.

The function of the computer display system of the present invention can be best understood when compared to the display system of the prior art as shown in FIG. 1. The display system of FIG. 1 includes a VGA controller 10 as shown. This controller 10 is connected to the SYSTEM DATA BUS 12 of the CPU 14 as shown. Included in the controller 10 is a DISPLAY FIFO 18 and VIDEO SHIFT LOGIC 20. Display data is loaded by CPU 14 into the DISPLAY FIFO 18 by way of the SYSTEM DATA BUS 12. The controller 10 then writes the display information in DISPLAY FIFO 18 to the DEDICATED FRAME BUFFER 16. DISPLAY FIFO 18 and VIDEO SHIFT LOGIC 20 then output the display data in DEDICATED FRAME BUFFER 16 to the VGA display through the VIDEO OUT output 22 of controller 10.

Figure 2:
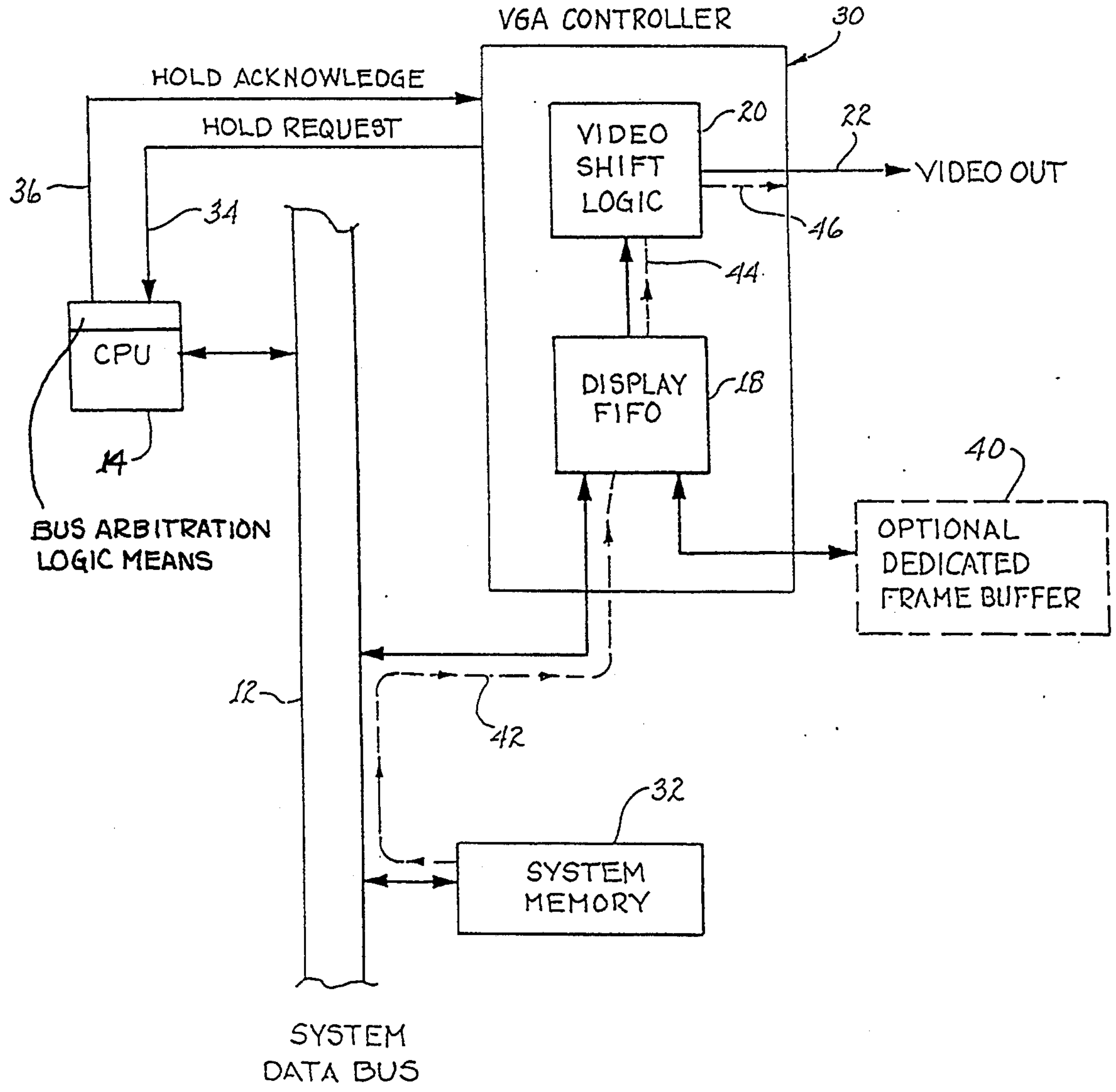
FIG. 2 is a block diagram of the computer display system of the present invention.

The VGA controller 30 of the present invention is shown in FIG. 2. Controller 30 is connected to the SYSTEM DATA BUS 12 of CPU 14 as shown. In addition, there is a block of SYSTEM MEMORY 32 that serves as a frame buffer for controller 30. Controller 30 has a DISPLAY FIFO 18 and VIDEO SHIFT LOGIC 20 similar to those found in the VGA controller 10 of the prior art. In addition, controller 30 has an output HOLD REQUEST 34 to CPU 14, which is used to request access to the SYSTEM DATA BUS 12, and also has an input HOLD ACKNOWLEDGE 36 from CPU 14 to indicate to the controller 30 when the CPU 14 has relinquished the bus, making the bus available for the controller 30 to transfer display data from the frame buffer located in SYSTEM MEMORY 32 to the DISPLAY FIFO 18.

When a display mode is used that does not require the size or speed of a dedicated frame buffer, a block of SYSTEM MEMORY 32 can be allocated by the computer system as a frame buffer. The CPU writes display data into the block of SYSTEM MEMORY 32 designated as frame buffer. The VGA controller 30 requests access to the SYSTEM DATA BUS 12 when display data is required in the DISPLAY FIFO 18 by asserting the 1IOLD REQUEST 34 line. CPU 14 then relinquishes control of the system address bus (not shown) and the SYSTEM DATA BUS 12 and asserts tIOLD ACKNOWLEDGE 36, which signals the controller 30 that it can now load display data from the frame buffer in SYSTEM MEMORY 32. The VGA controller takes control of the system address bus and the SYSTEM DATA BUS 12, and loads the display data from the frame buffer in SYSTEM MEMORY 32 into its DISPLAY FIFO 18. Once the transfer is complete the controller 30 negates the HOLD REQUEST 34 line, thereby returning control of the system address bus and SYSTEM DATA BUS 12 to CPU 14. While CPU 14 continues processing, the data in DISPLAY FIFO 18 is used to refresh the VGA display device by shifting the appropriate data through the VIDEO SHIFT LOGIC 20 and out the VIDEO OUT output 22 of controller 30. In this manner, display data flows from SYSTEM MEMORY 32 to DISPLAY FIFO 18 to VIDEO SHIFT LOGIC 20 to the VIDEO OUT 22 output, as indicated by the dotted lines 42, 44 and 46.

An OPTIONAL DEDICATED FRAME BUFFER 40 can be used in conjunction with the controller 30 of the present invention. In this manner the VGA controller 30 can be used in the same mode of operation as the VGA controller 10 of the prior art. This feature allows a controller 30 to be installed into a computer system without the OPTIONAL DEDICATED FRAME BUFFER 40, thereby reducing the cost of the system. With this arrangement, the OPTIONAL DEDICATED FRAME BUFFER 40 can be added at a later date if the increased display performance is needed. In the alternative, the controller 30 can be installed into the computer system with the OPTIONAL DEDICATED FRAME BUFFER 40 installed. The controller 30 can then be configured to use either SYSTEM MEMORY 32 as a frame buffer or to use the OPTIONAL DEDICATED FRAME BUFFER 40 as the display mode and particular application requires.

While the invention has been described in its preferred embodiment, it is to be understood that the words which have been used are words of description rather than limitation, and that changes may be made within the purview of the appended claims without departing from the true scope and spirit of the invention in its broader aspects.

I claim:

1. A computer display system comprising, in combination:

a central Processing Unit (CPU) having an associated data bus coupled thereto;

display controller means coupled to said CPU for controlling a display device, said display controller means comprising, in combination:

a display first-in first-out (FIFO) electrically coupled to said data bus of said CPU, said CPU having means for writing display data into said display FIFO;

video shift logic means electrically coupled to said display FIFO for converting said display data in said display FIFO to a serial format;

video output means electrically coupled to said video shift logic means for allowing connection to said display device; and system memory means electrically coupled to said data bus having a block of said system memory means defined as a frame buffer for storing display information for said display controller means;

said CPU having bus arbitration logic means for permitting said CPU to relinquish control of said data bus to a second bus controller, said display controller means being electrically coupled to said bus arbitration logic means of said CPU in such a way as to allow said display controller means to request and receive control of said data bus, said display controller means becoming said second bus controller for the purpose of transferring said display data from said block of system memory means defined as a frame buffer to said display FIFO in said display controller means.

2. The system of claim 1 further comprising optical memory means for providing a dedicated frame buffer for said display FIFO.

3. The system of claim 1 wherein said display controller means comprising a Video Graphic Adapter (VGA) controller.

4. A method for providing a computer display system comprising, in combination:

providing a Central Processing Unit (CPU) having an associated data bus coupled thereto;

providing display controller means coupled to said CPU for controlling a display device, said display controller means comprising, in combination:

a display first-in first-out (FIFO) electrically coupled to said data bus of said CPU, said CPU having means for writing display data into said display FIFO;

video shift logic means electrically coupled to said display FIFO for converting said display data in said display FIFO to a serial format;

video output means electrically coupled to said video shift logic means for allowing connection to said display device; and providing system memory means electrically coupled to said data bus having a block of said system memory means defined as a frame buffer for storing display information for said display controller means;

said CPU having bus arbitration logic means for permitting said CPU to relinquish control of said data bus means to a second bus controller, said display controller means being electrically coupled to said bus arbitration logic means of said CPU in such a way as to allow said display controller means to request and receive control of said data bus, said display controller means becoming said second bus controller for the purpose of transferring said display data from said block of system memory means defined as a frame buffer to said display FIFO in said display controller means.

5. The method of claim 4 further comprising optional memory means for providing a dedicated frame buffer for said display FIFO.

6. The method of claim 4 wherein said display controller means comprising a Video Graphics Adapter (VGA) controller.

7. The method of claim 4 further comprising the steps of:

allocating a block of said system memory means as said frame buffer;

said display controller means obtaining control of said data bus via said bus arbitration logic of said CPU;

said display controller means transferring said display data from said frame buffer in said system memory means to said display FIFO in said display controller means via said data bus; and said video shift logic means converting said display data in said display FIFO to a serial format, and shifting said display data serially out said video output means to said display device.

* * * * *